H. P. BALL.
ELECTRICALLY HEATED COOKING DEVICE.
APPLICATION FILED JUNE 8, 1912.

1,077,866.

Patented Nov. 4, 1913.

2 SHEETS—SHEET 1.

Witnesses:
Earl G. Klock.
J. Ellis Glen

Inventor:
Henry Price Ball,
by Albert G. Davis
His Attorney

H. P. BALL.
ELECTRICALLY HEATED COOKING DEVICE.
APPLICATION FILED JUNE 8, 1912.

1,077,866.

Patented Nov. 4, 1913.

2 SHEETS—SHEET 2.

Witnesses:
Earl G. Klock.
J. Ellis Glen.

Inventor:
Henry Price Ball,
by Albert G. Davis
His Attorney.

UNITED STATES PATENT OFFICE.

HENRY PRICE BALL, OF PITTSFIELD, MASSACHUSETTS, ASSIGNOR TO GENERAL ELECTRIC COMPANY, A CORPORATION OF NEW YORK.

ELECTRICALLY-HEATED COOKING DEVICE.

1,077,866.   Specification of Letters Patent.   Patented Nov. 4, 1913.

Application filed June 8, 1912. Serial No. 702,472.

*To all whom it may concern:*

Be it known that I, HENRY PRICE BALL, a citizen of the United States, residing at Pittsfield, in the county of Berkshire, State of Massachusetts, have invented certain new and useful Improvements in Electrically-Heated Cooking Devices, of which the following is a specification.

My invention relates to electrically heated cooking devices, one of the objects of my invention being to provide a device of this character which will be suitable for carrying out a plurality of cooking operations and at the same time will be light and compact and, therefore, easily handled.

My invention includes means for performing several cooking operations such as broiling, toasting, boiling and frying. In order to secure compactness the same heating unit is utilized for these operations and the arrangement is such that the broiling may be done simultaneously with one of the other operations. This is accomplished by making use of both sides of the heating unit, the broiling chamber being located below the unit and means being provided for supporting articles above the same. Preferably the cover of the boiling vessel or saucepan is of such shape that it may serve as another cooking utensil such as a frying pan and also as a cover for the heating unit.

Various other features and advantages of my invention will appear from the description which follows.

My invention will be more clearly understood by reference to the accompanying drawings, in which—

Figure 1:
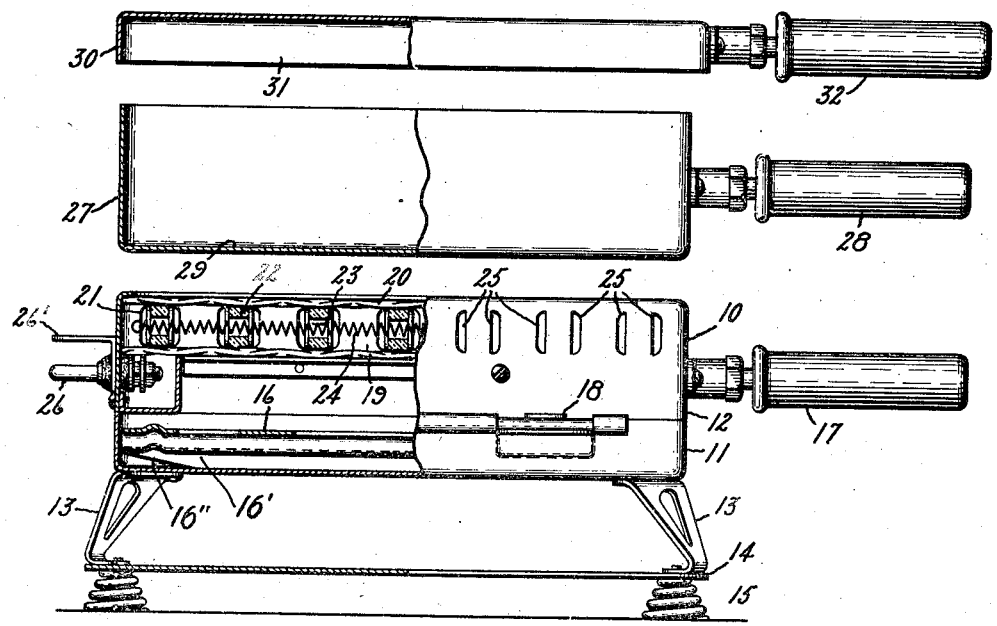
Figure 2:
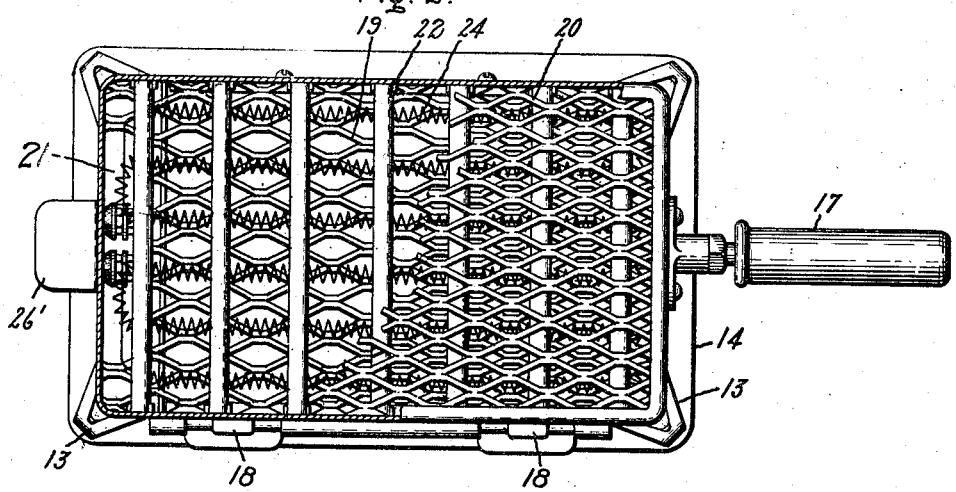
Figure 3:
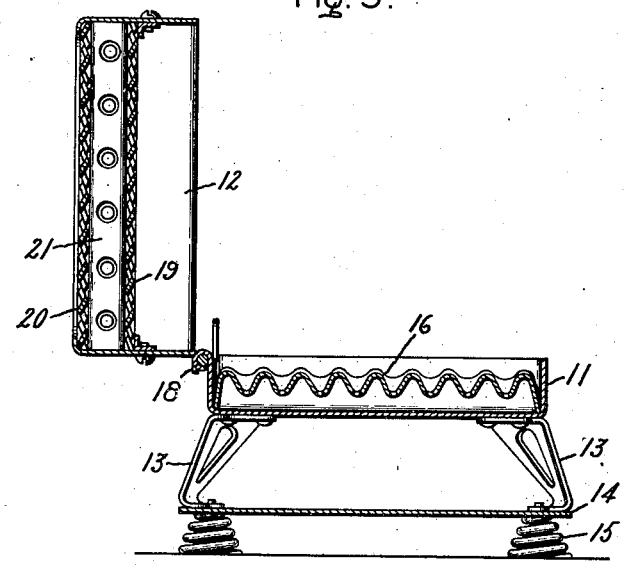
Figure 4:
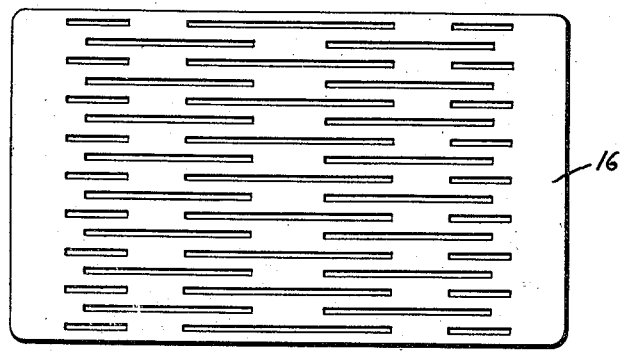
Figure 5:
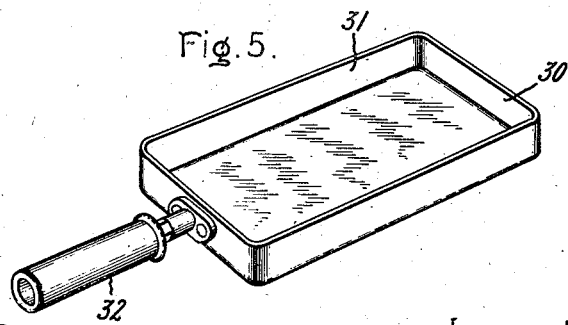

Figure 1 is a disassembled elevational view of my device; Fig. 2 is a horizontal section through the heating unit; Fig. 3 is a vertical, transverse section of that portion of the device comprising the broil-chamber and heating unit; Fig. 4 is a plan view of the grid or false bottom of the broiling chamber; Fig. 5 is an isometric view of the frying pan or cover of the saucepan or heating unit.

As shown in Figs. 1 and 3, the portion 10 of my apparatus having a base portion 11 and a cover portion 12 is supported through legs 13 upon plate 14 which in turn is provided with spiral supports 15. The plate 14 serves as a baffle to deflect the heat from the table upon which the device may be placed. The broiling chamber which is formed by the parts 11 and 12 is provided with the false bottom or grid 16 which is preferably corrugated and slotted so as to allow the juice flowing from the meat during the broiling operation to escape into the bottom of the chamber. The grid 16 is reversible being supported by the sides 16' in the position shown in the drawing and having the bottom of the corrugations in contact with the bottom of the chamber in the other position. This construction allows an article to be broiled at a higher or lower temperature as desired. The ends of the grid sides 16' are cut away as at 16''. This allows the grid to be readily removed. When it is in the position shown in the drawing, by pressing upon one end the other end may be tilted upwardly making it easily accessible to the operator. When the grid is in the reverse position it may be readily removed by grasping the sides 16'. The removability of the grid permits the broiler to be readily cleaned. It is also to be noted that when the grid is in the position shown in the drawing considerable space is allowed for the collection of juices below the same. The grid in either position serves to prevent grease from being ignited as it constitutes a cooling screen between the same and the heating unit. The portion 12 which serves as a cover for the broiling chamber is provided with the handle 17 and is preferably hinged as at 18 to the lower or base portion 11. The top of this portion of the device is formed by two spaced grids or gratings 19, 20, between which is supported the electrical resistance heating unit 21. The said heating unit comprises the insulating spacing bars 22 of porcelain or other refractory material through perforations 23 in which is threaded the electrical resistance wire 24 so as to form a flat unit which is substantially coextensive with the top of the chamber. The resistance wire is preferably of calorite described in a certain Dempster Patent No. 901,428. Perforations 25 may be formed in the side walls of the cover 12 so as to partly disclose the coils, which adds to the attractiveness of the device when in use. Terminals 26 are provided for the resistance wire and for the reception of a plug connected to leads from a source of electric energy. A plate 26' is preferably mounted over the terminals to protect the same from grease and dirt. The boiling receptacle or saucepan 27 is provided with handle 28 and the bottom 29 thereof is preferably coextensive with the upper grid 20 and flat so that good thermal contact may be secured between it and the said grid. The cover 30 for the boiling receptacle is of such shape as to be suitable for use as a frying pan and may be of aluminum so as to secure the thickness of metal necessary for such a utensil without undue weight. It has a rim 31 and handle 32 and is adapted to fit closely over the top of the boiling receptacle or over the heating unit.

By raising the cover 12 of the broiling chamber the meat to be broiled may be placed upon the false bottom or grid 16 and the cover may be then swung to its former position. Energy may be then supplied to the resistance heating unit and the heat will be deflected down upon the meat. The broiling operation may be carried on at a higher or lower temperature depending on the position of the grid. At the same time bread or other articles of food may be toasted by placing them upon the upper grid 20. Instead of utilizing the grid 20 for toasting, the saucepan 27 may be placed thereon and used for such operations as boiling or the cover 30 of the said receptacle may be inverted and utilized as a frying pan by placing it upon said grid. It is apparent also that the member 30 may be utilized as a cover for the heating unit thus making the device into a stove or griddle.
The construction is such that a part of the heat furnished by the unit is deflected upwardly by the bottom of the broiling chamber and a part is deflected downwardly by bodies placed upon the grid 20. This causes a very efficient operation as most of the heat is utilized for cooking.

It is obvious that my device may be utilized for carrying out independently any one of the cooking operations hereinbefore referred to.

Various changes may be made in the specific details of my apparatus without departing from the spirit of my invention, the scope of which is set forth in the following claims.

What I claim as new and desire to secure by Letters Patent of the United States is—

1. In an electrically heated device, the combination of a chamber having a grid spaced from the bottom thereof, an electric resistance unit constituting a portion of the upper wall of said chamber and means for supporting articles to be heated over said heating unit.

2. In an electrically heated device, a chamber having a grid spaced from the bottom thereof, a movably mounted electric resistance heating means located over said chamber and constituting substantially the top thereof and means for supporting articles to be heated over said heating means.

3. In an electrically heated device, the combination of a broiling chamber, an electrical resistance heating unit located in the upper part of the same, a cooking vessel removably supported upon said heating unit and a rimmed cover for the said vessel.

4. In an electrically heated device, a broiling chamber having an electrical resistance heating unit located in the upper part of the same, a cooking vessel removably supported over said heating unit and a rimmed cover for said vessel removable from the same and adapted also to constitute a cooking vessel.

5. In an electrically heated device, a broiling chamber comprising top and bottom portions, an electrical resistance heating unit mounted in said top portion and a removable and reversible grid in the said bottom portion having means on one face thereof for spacing it from the bottom of said broiling chamber.

6. In an electrically heated device, a broiling chamber having an electrical resistance heating unit in the top thereof and a removable grid in the lower part thereof having side members for spacing the same from the bottom of said broiling chamber, said side members being cut away at one end of the grid.

7. In an electrically heated device, the combination of a chamber adapted to be used for operations such as broiling, a flat resistance heating unit pivotally mounted over said chamber, the said unit comprising resistance conductors exposed on both sides of said unit.

8. In an electrically heated device, the combination of a chamber adapted to be used for operations such as broiling, a flat resistance heating unit mounted over said chamber, and comprising resistance conductors exposed on both sides of said unit and a removable flanged cover adapted to fit over said heating unit.

In witness whereof, I have hereunto set my hand this 5th day of June, 1912.

HENRY PRICE BALL.

Witnesses:
J. G. EDDY,
H. H. ARMSTRONG.